No. 857,114. PATENTED JUNE 18, 1907.
K. SCHNAITMANN.
GEAR FOR AUTOMOBILES, &c.
APPLICATION FILED DEC. 3, 1906.
4 SHEETS—SHEET 1.
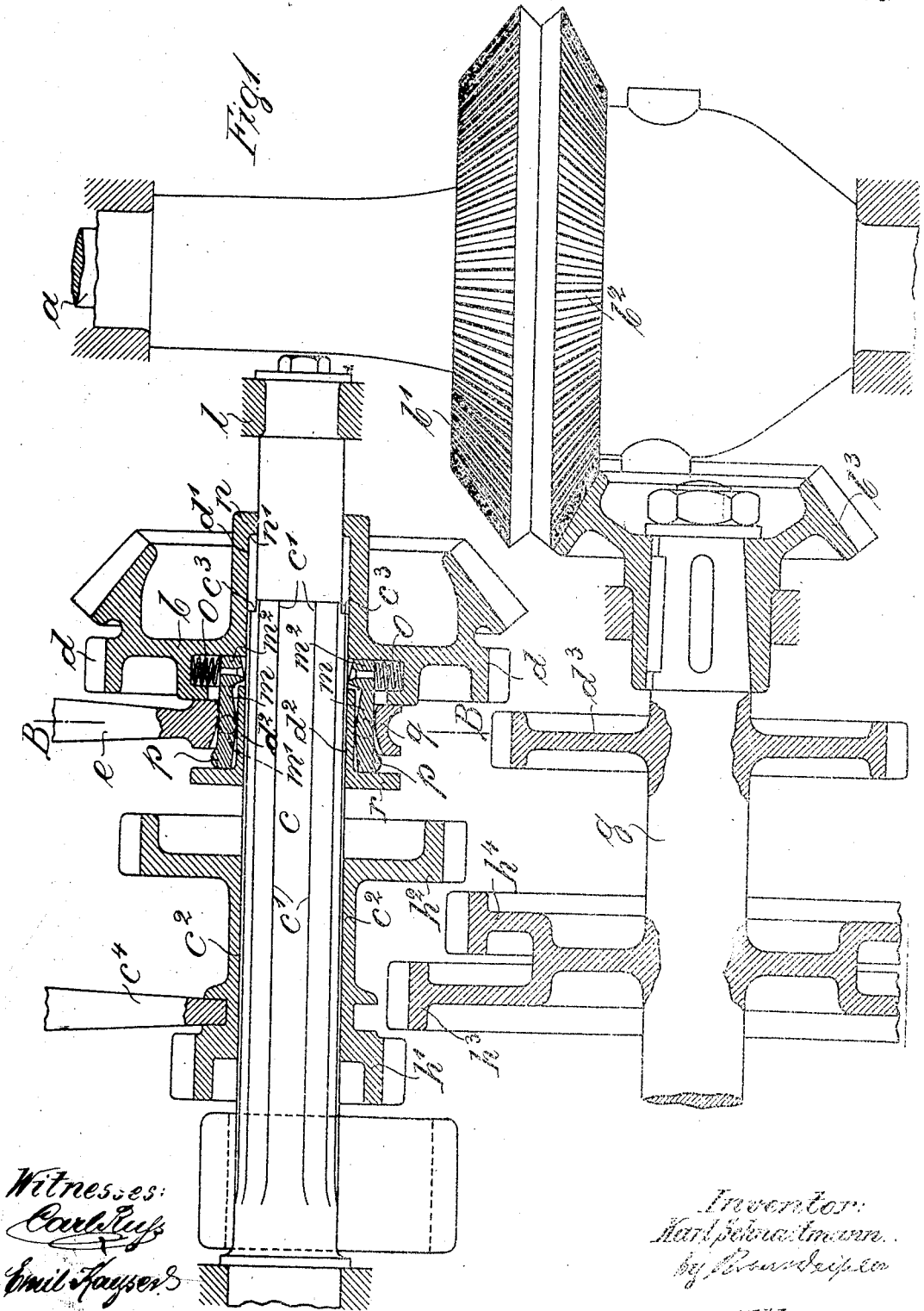

No. 857,114. PATENTED JUNE 18, 1907.
K. SCHNAITMANN.
GEAR FOR AUTOMOBILES, &c.
APPLICATION FILED DEC. 3, 1906.
4 SHEETS—SHEET 2.

Witnesses:
Carl Reuss
Emil Kayser

Inventor:
Karl Schnaitmann.
By Robert Heipler
Attorney.

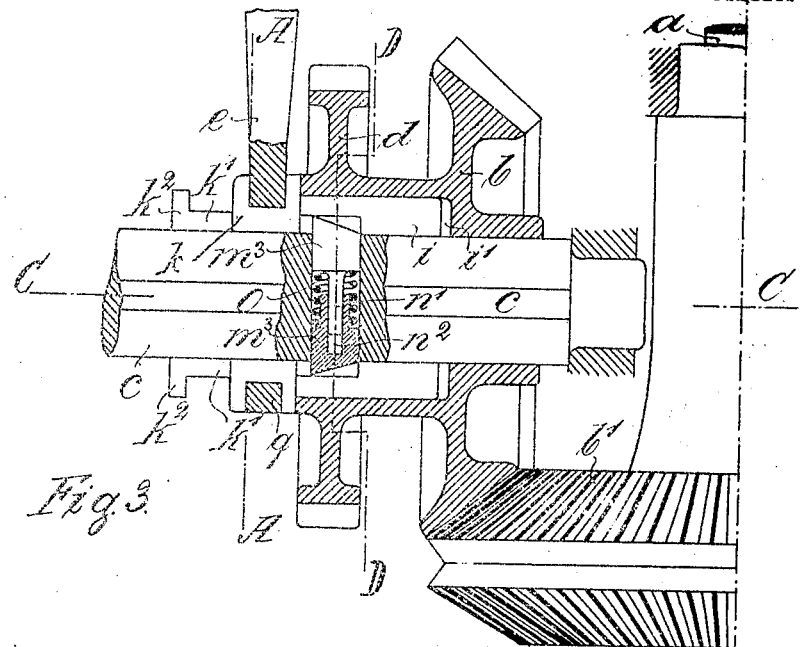
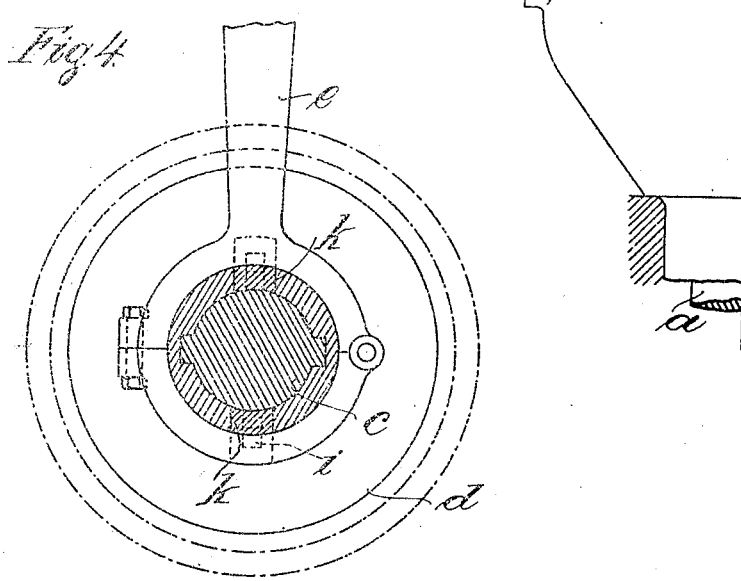

No. 857,114. PATENTED JUNE 18, 1907.
K. SCHNAITMANN.
GEAR FOR AUTOMOBILES, &c.
APPLICATION FILED DEC. 3, 1906.
4 SHEETS—SHEET 4.
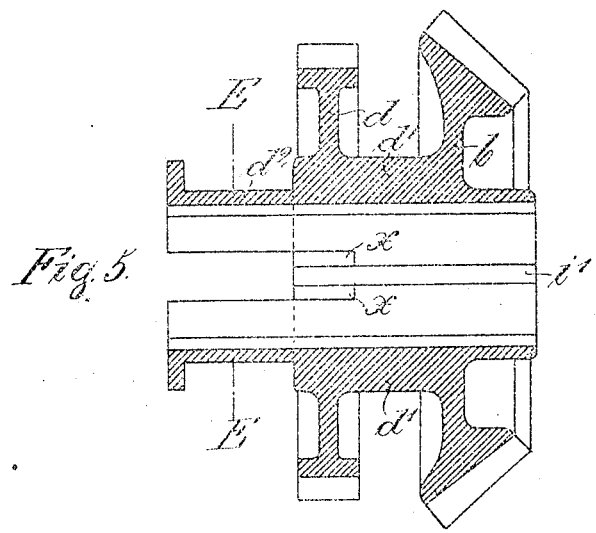
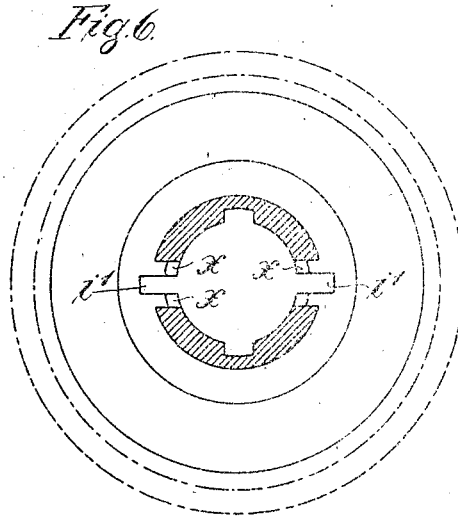
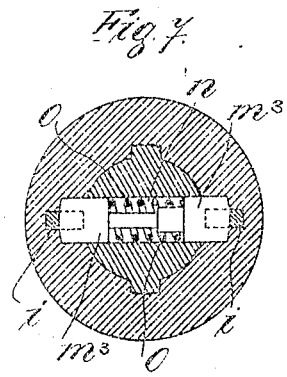
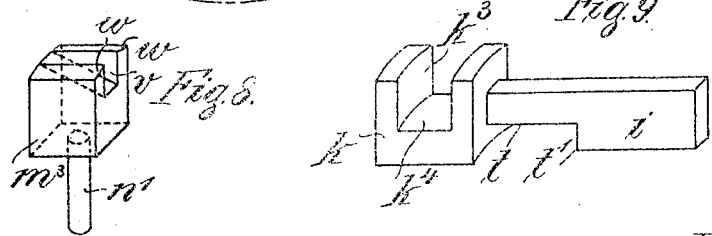
Witnesses:
Carl Rapp
Emil Kayser
Inventor:
Karl Schnaitmann
by Rondzipfer
Attorney

UNITED STATES PATENT OFFICE.

KARL SCHNAITMANN, OF UNTERTÜRKHEIM, GERMANY, ASSIGNOR TO THE FIRM OF DAIMLER-MOTOREN-GESELLSCHAFT, OF UNTERTÜRKHEIM, GERMANY.

GEAR FOR AUTOMOBILES, &c.

No. 857,114.

Specification of Letters Patent.

Patented June 18, 1907.

Application filed December 3, 1906. Serial No. 346,158.

*To all whom it may concern:*

Be it known that I, KARL SCHNAITMANN, a subject of the King of Würtemberg, and a resident of Untertürkheim-on-the-Neckar, in the Kingdom of Würtemberg, German Empire, have invented a new and useful Improved Train of Gears for Automobiles and the Like Vehicles, of which the following is an exact specification.

My invention relates to an improved train of gears for changing the speed for automobiles and the like vehicles and more especially for such automobiles in which a differential shaft and a driving shaft is arranged. A device which has the same object has been described by me in my copending United States patent application Serial No. 346157 filed December 3rd 06. This last mentioned application describes a train of gears which is provided with a driving shaft, upon which a bevel wheel is arranged loosely but not adapted to slide longitudinally, and engages with a bevel wheel of the so-called differential shaft.

According to the present invention I have provided for a bevel wheel arranged on the driving shaft adapted to slide but not to rotate relatively to the latter and this bevel wheel is adapted to be thrown into gear with the bevel wheel of the differential shaft and to be disengaged therefrom. Provisions are made according to my invention to set the slidable bevel wheel on the driving shaft when engaging with the bevel wheel of the differential shaft and to release it for the purpose of disengaging the wheels one from another. Owing to this disengagement of the latter wheels the objectionable noise of the idle running toothed wheels is avoided, which occurs in the arrangement of my co-pending application.

In order to make my invention clear, I refer to the accompanying drawings, in which:—

Figure 10:
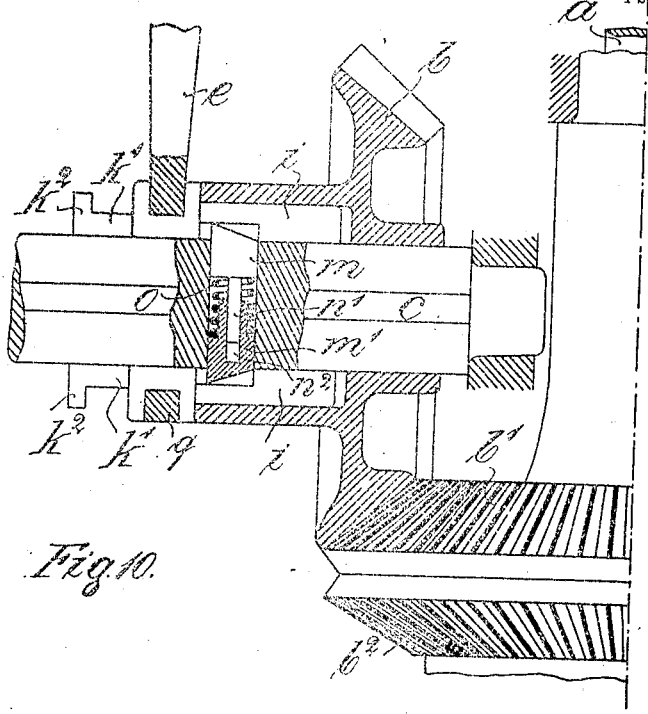
Figure 2:
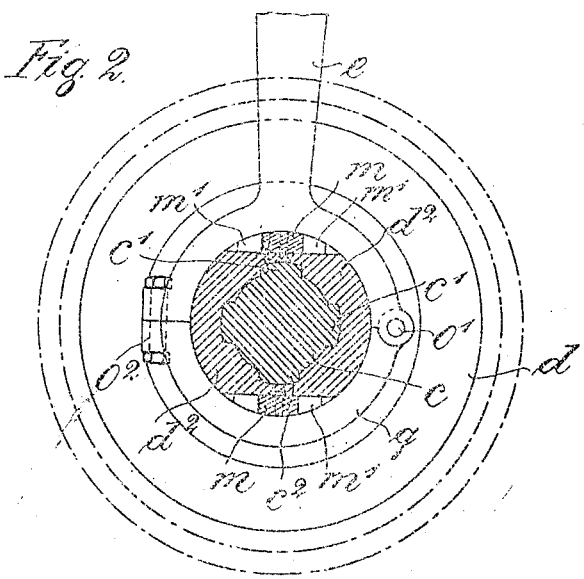

Figure 1 is a fragmentary sectional plan view of my improved train of gears, Fig. 2 is a vertical cross section on line B—B of Fig. 1, Fig. 3 is a modified construction in a fragmentary sectional plan view, Fig. 4 is a vertical cross section on line A—A of Fig. 3, Fig. 5 is a longitudinal horizontal section of the slidable bevel wheel of the modified structure according to Fig. 3, on line C—C. Fig. 6 is a vertical cross section on line E—E of Fig. 5, Fig. 7 is a cross section on line D—D of Fig. 3, Figs. 8 & 9 are details in a perspective view, Fig. 10 is a modification in a horizontal cross section intended to illustrate the arrangement used as a coupling device only.

The differential shaft $a$ suitably mounted in the frame of the automobile (not further shown) is provided with two bevel wheels $b'$ $b^2$. $c$ is a driving-shaft having ledges or tongues $c'$ (see Fig. 2) projecting into grooves of the hubs of the different wheels arranged on the shaft $c$ whereby the wheels are keyed to the shaft. $b$ is a conical wheel and is adapted to be displaced on the shaft $c$ and to be set fast thereon or released in the manner as will hereinafter be fully described.

The hub $d'$ of the bevel wheel $b$ is extended to the lefthand side, as to form a socket part $d^2$. This part $d^2$ is recessed on opposite sides to receive in its recesses pawls $m$. $m'$ are pins of the pawls arranged in corresponding recesses of the socket-part $d^2$ and shaped, to enable the socket-part to rotate within the ring $q$ embracing the part $d^2$. The pawl $m$ is provided with a hook or nose $m^2$ and a spring $o$ located in holes of the hub $d'$ tends to force the nose against the shaft $c$. At its other end the pawl $m$ is provided with a projection $p$. On the side adjacent to the projection $p$ the ring $q$ is slightly tapered on its inside and is in contact with the pawl $m$ on its righthand end.

$r$ is a rim for retaining the ring $q$ on the socket $d^2$.

The hub $d'$ is rectangularly inwardly turned, as to form a stop $n$ sliding therewith on the recessed part of the shaft $c$.

$d$ is a toothed wheel formed integrally with the bevel wheel $b$. The setting ring $q$ is built up of two parts hinged with each other by a pin $o'$ and connected with each other by a screw $o^2$. Toothed wheels $h'$ $h^2$ are made integrally with a socket piece $c^2$ and adapted to engage with toothed wheels $h^3$ $h^4$ respectively. The toothed wheels $h'$ $h^2$ are adapted to slide but not to rotate on the driving shaft $c$ and can be displaced or shifted by means of the setting rod $c^4$.

$g$ is a counter shaft carrying the toothed wheel $d^3$, adapted to engage with the toothed wheel $d$, and the bevel wheel $b^3$, fixedly arranged thereon.

The operation of this construction will be readily understood. The driving shaft $c$ transmits no motion to the differential shaft $a$ and to the counter shaft $g$ in the position of the wheels as illustrated. For operating directly the differential shaft by the driving shaft $c$, the bevel wheel $b$ is displaced by means of the setting rod $e$ to the righthand side till the nose $m^2$ of the pawl $m$ is opposite to the recess $c^3$ of the shaft $c$. In this position the nose is forced into the recess $c^3$ by the action of the spring $o$ and the bevel wheel $b$ is held in engagement with the wheel $b'$.

For releasing the driving shaft the setting rod $e$ is moved to the lefthand side, so that the projection $p$ interferes with the tapered inner surface of the ring $q$, the lefthand end of the pawl $m$ is depressed and the nose $m^2$ removed from the recess $c^3$. Now by further movement of the ring to the lefthand side the bevel wheel $b$ can be shifted on the driving shaft and is thereby disengaged from the bevel wheel $b'$.

In the modification shown in the Figs. 3 to 9 for the pawls setting pieces $m^3$ are provided. These setting pieces are arranged in a hole $n$ of the shaft $c$, and each piece is provided with a wedge-shaped cut $v$. A guiding pin $n'$ of the one setting piece projects into a cylindrical boring $n^2$ of the other setting piece, and $o$ is a spring intended to force radially outward both the setting pieces $m^3$. $i$ is an adjusting or governing rail (see Fig. 9) mounted in the groove $i'$ of the hub $d'$. $t$ is a recess provided in the adjusting rail $i$ embracing therewith the setting piece $m^3$ in a distinct position of the bevel wheel $b$. The head $k$ is arranged in the recess $k'$ provided partially in the hub $d'$ and in the extended hub $d^2$, having an annular projection $k^2$. The head is provided with a guiding groove $k^3$ receiving therein the setting ring $q$. It will be observed that the bottom surface $k^4$ of the head $k$ is curved in correspondence with the inner diameter of the ring $q$. Ledges $c'$ projecting into grooves of the hub $d'$ prevent the bevel wheel $b$ and the toothed wheel $d$ made integrally with the latter from loose rotation on the shaft $c$.

The construction as just described works in the following manner:—The bevel wheel $b$ is prevented from longitudinal movement when engaging with the bevel wheel $b'$ by the setting pieces $m^3$ projecting into the recesses $k'$ of the hub $d'$ in such manner that the edges $w$ of the setting pieces bear against the walls $x$ of the recess $k'$ and a movement caused by the axial thrust of the bevel gearing is made impossible thereby. For disengaging the bevel wheels $b$ $b'$ the guiding rail $i$ is displaced to the left hand side and the edge $t'$ of the recess $t$ pushes against the inclined bottom of the groove $v$ and in moving along thereupon the setting pieces $m^3$ are forced into the recess $n$ of the shaft $c$, so that the piece $m^3$ is removed from the recess $k'$ and now by further movement of the setting rod $e$ the bevel wheel $b$ can be disengaged from the bevel wheel $b'$.

In the Fig. 10 is shown a bevel $b$ alone. In this case the latter represents a coupling device only for coupling the driving shaft $c$ with the differential shaft $a$.

Having thus fully described the nature of my invention, what I desire to secure by Letters Patent of the United States is:—

1. A gearing comprising a differential shaft, a bevel wheel thereupon, a driving shaft, a bevel wheel, adapted to slide longitudinally but not to rotate on the driving shaft and engaging with said bevel wheel of the differential shaft, means for locking the slidable bevel wheel in engagement with the bevel wheel of the differential shaft, and means for shifting the bevel wheel on the driving shaft.

2. A gearing comprising a differential shaft, two bevel wheels thereon, a driving shaft, a bevel wheel, adapted to slide longitudinally but not to rotate on the driving shaft, means for setting fast the slidable bevel wheel when engaging with the bevel wheel of the differential shaft, a counter shaft, a bevel wheel and spur-wheels fixedly arranged thereon, the last mentioned bevel wheel engaging with the other bevel wheel of the differential shaft, and means for shifting the slidable bevel wheel of the driving shaft.

3. A gearing comprising a differential shaft, a bevel wheel thereupon, a driving shaft, a bevel wheel, adapted to slide longitudinally but not to rotate on the driving shaft, this bevel wheel having an extended hub and grooves ($i^1$ $k'$) governing rails having heads and located in said grooves, setting pieces arranged in a hole of the driving shaft and having wedge-shaped grooves, adapted to coöperate with the guiding rails, a spring tending to force outwardly the setting pieces, and a hinged setting ring engaging with the heads of the guiding rails.

4. A gearing comprising a differential shaft, bevel wheels thereupon, a driving shaft, a bevel wheel, adapted to slide longitudinally but not to rotate on the driving shaft, the bevel wheel having an extended hub and provided with grooves ($i^1$ $k'$), governing rails having heads and arranged in the aforementioned grooves, setting-pieces located in a hole of the driving shaft and provided with wedge-shaped grooves therein and coöperating with the governing rails, a spring tending to force the setting pieces into the recesses ($k'$), a toothed wheel made integrally with the hub of the bevel-wheel $b$, toothed wheels adapted to slide but not to rotate on the driving shaft, a counter-shaft, and toothed wheels on the counter shaft, the latter wheels engaging with the toothed wheels of the driving shaft, and a bevel wheel fixedly arranged on the counter shaft and engaging with the other bevel wheels of the differential shaft, and means for displacing the slidable wheels of the driving shaft.

5. A gearing comprising a differential shaft, two bevel wheels thereon, a driving shaft, a bevel-wheel adapted to slide but not to rotate and mounted on the driving shaft and having an extended hub, pawls arranged pivotally in recesses of the extended hub, springs forcing the one end of the pawls against the driving shaft, a setting ring embracing the extended hub and the pawls, and adapted to operate the pawls as to remove the other end of the pawls from the driving shaft, a toothed wheel made integrally with the bevel wheel of the driving shaft, toothed wheels adapted to slide but not to rotate on the driving shaft, a counter shaft, toothed wheels made integrally with the counter shaft, and adapted to engage with the toothed wheels of the driving shaft, and a bevel wheel fixedly arranged on the counter shaft and engaging with the other wheel of the differential shaft.

In witness whereof I have hereunto set my hand in the presence of two witnesses.

KARL SCHNAITMANN.

Witnesses:
 ROBERT W. MAUD,
 ADOLF STROHM.